United States Patent
Ooi et al.

(10) Patent No.: US 7,057,833 B2
(45) Date of Patent: Jun. 6, 2006

(54) IMAGE CAPTURE DEVICE

(76) Inventors: Yeow-Thiam Ooi, 11, Lorong Cengkeh 3, Taman Cengkeh, Butterworth, Penang 13020 (MY); Haw-Chyn Cheng, 22, Jalan Pantai Butterworth, Penang, 12000 (MY); Gurbir Singh A-L Balwant Singh, 11, Solok Besi, Island Park Georgetown, Penang, 11600 (MY); Shazli Husni, Blok J-1-05, Lorong Mahsuri 7 Bayan Baru, Penang 11950 (MY)

( * ) Notice: Subject to any disclaimer, the term of this patent is extended or adjusted under 35 U.S.C. 154(b) by 33 days.

(21) Appl. No.: 10/934,709

(22) Filed: Sep. 3, 2004

(65) Prior Publication Data

US 2006/0050417 A1    Mar. 9, 2006

(51) Int. Cl.
G02B 7/02       (2006.01)
G06K 7/10       (2006.01)
H04N 5/225      (2006.01)

(52) U.S. Cl. .................. 359/819; 235/454; 235/462.21; 348/335; 348/340

(58) Field of Classification Search ................ 359/819, 359/811; 235/454, 462.21, 462.24, 462.42, 235/462.43; 348/335, 340
See application file for complete search history.

(56) References Cited

U.S. PATENT DOCUMENTS

| | | | |
|---|---|---|---|
| 6,639,732 B1 * | 10/2003 | Omura et al. ................ 359/727 |
| 6,832,725 B1 * | 12/2004 | Gardiner et al. ....... 235/462.21 |
| 6,876,504 B1 * | 4/2005 | Peng et al. ................. 359/819 |
| 2003/0019934 A1 * | 1/2003 | Hunter et al. ............. 235/462.2 |
| 2003/0029917 A1 * | 2/2003 | Hennick et al. ............ 235/454 |
| 2003/0034394 A1 * | 2/2003 | Gannon et al. ............. 235/454 |
| 2003/0089766 A1 * | 5/2003 | Needham .................... 235/375 |

* cited by examiner

*Primary Examiner*—Loha Ben

(57) ABSTRACT

An image capture device includes a substrate and an image sensor mounted to a front side of the substrate. A lens module having a light blocking member is mounted to the front side of the substrate so that the light blocking member cooperates with the substrate to substantially prevent light from entering an interior region defined by the lens module and the substrate through a joint defined therebetween. A lens indexing member on the lens module cooperates with a substrate indexing member provided on the substrate to align the lens module with respect to the substrate.

20 Claims, 3 Drawing Sheets

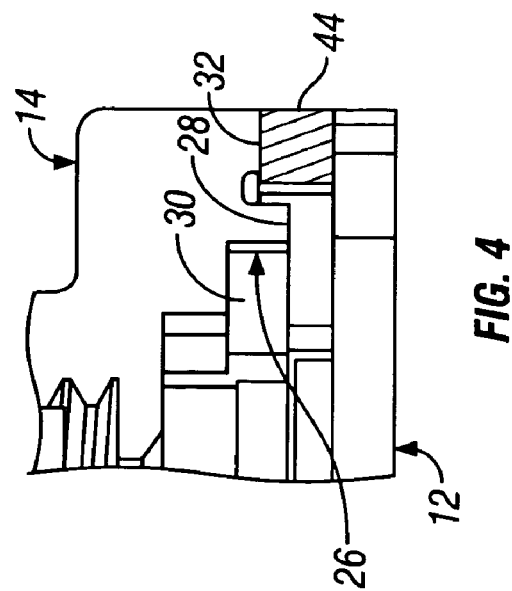
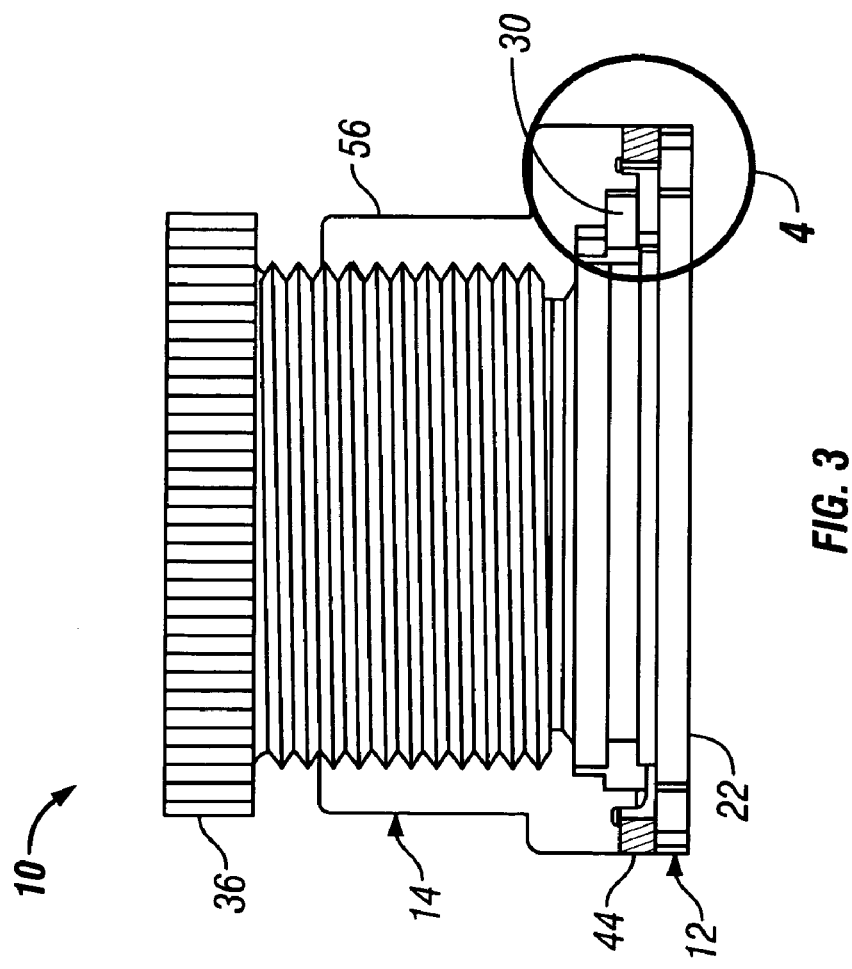

IMAGE CAPTURE DEVICE

BACKGROUND

Electronic image capture devices are well-known in the art and commonly include an image sensor, such as a CCD or CMOS array, as well as a lens assembly. The lens assembly focuses light on the image sensor, which converts the incident light into electronic signals suitable for processing. Such image capture devices have been used in a nearly limitless number of electronic systems and devices.

While many different structural configurations have been developed for electronic image capturing devices, few have proven to provide a good balance between structural integrity (i.e., the ability of the structure to prevent unwanted light or environmental contamination into the image capture device), low cost, and manufacturability.

SUMMARY OF THE INVENTION

An image capture device may comprise a substrate, and an image sensor mounted to a front side of the substrate. A lens module having a light blocking member is mounted to the front side of the substrate so that the light blocking member cooperates with the substrate to substantially prevent light from entering an interior region defined by the lens module and the substrate through a joint defined therebetween. A lens indexing member on the lens module cooperates with a substrate indexing member provided on the substrate to align the lens module with respect to the substrate.

BRIEF DESCRIPTION OF THE DRAWINGS

Illustrative and presently preferred exemplary embodiments of the invention are shown in the drawings in which:

FIG. 3 is a cross-sectional view in elevation of the image capture device; and

FIG. 4 is an enlarged cross-sectional view in elevation of the image capture device illustrated in FIG. 3 more clearly showing the joint defined between the substrate and lens module of the image capture device.

DETAILED DESCRIPTION OF THE PREFERRED EMBODIMENTS

Figure 1:
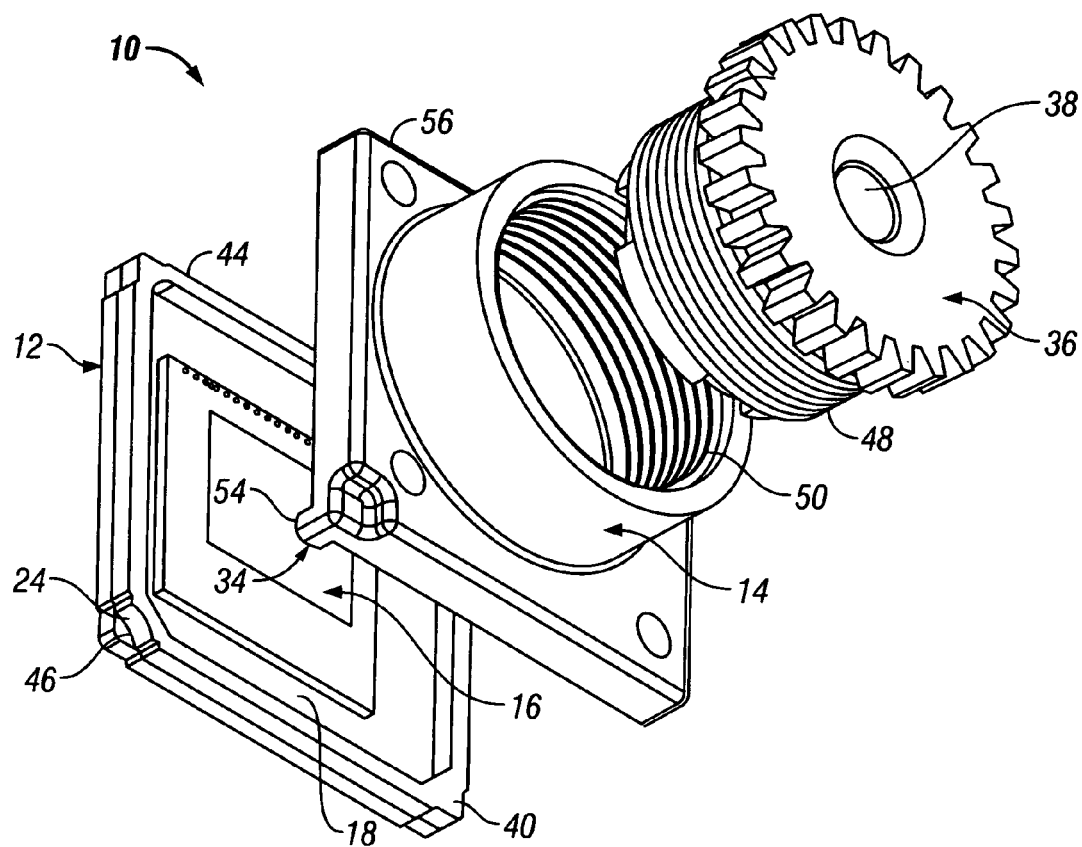
FIG. 1 is an exploded perspective view showing the front portion of an image capture device according to one embodiment of the invention.

An image capture device 10 according to one embodiment of the invention is illustrated in FIGS. 1–4 and may comprise a substrate 12, and a lens module 14 adapted to be mounted to the substrate 12. An image sensor 16 is mounted to a front side 18 of substrate 12 and, in one embodiment, is electrically connected to a plurality of solder pads 20 provided on a back side 22 of substrate 12. See FIG. 2. One or more substrate indexing members 24 (only one of which is visible in FIG. 1) are also provided on the substrate 12. In the embodiment shown and described herein, the substrate 12 is fabricated from a ceramic material, although other materials could also be used, as will be described in further detail below.

Figure 2:
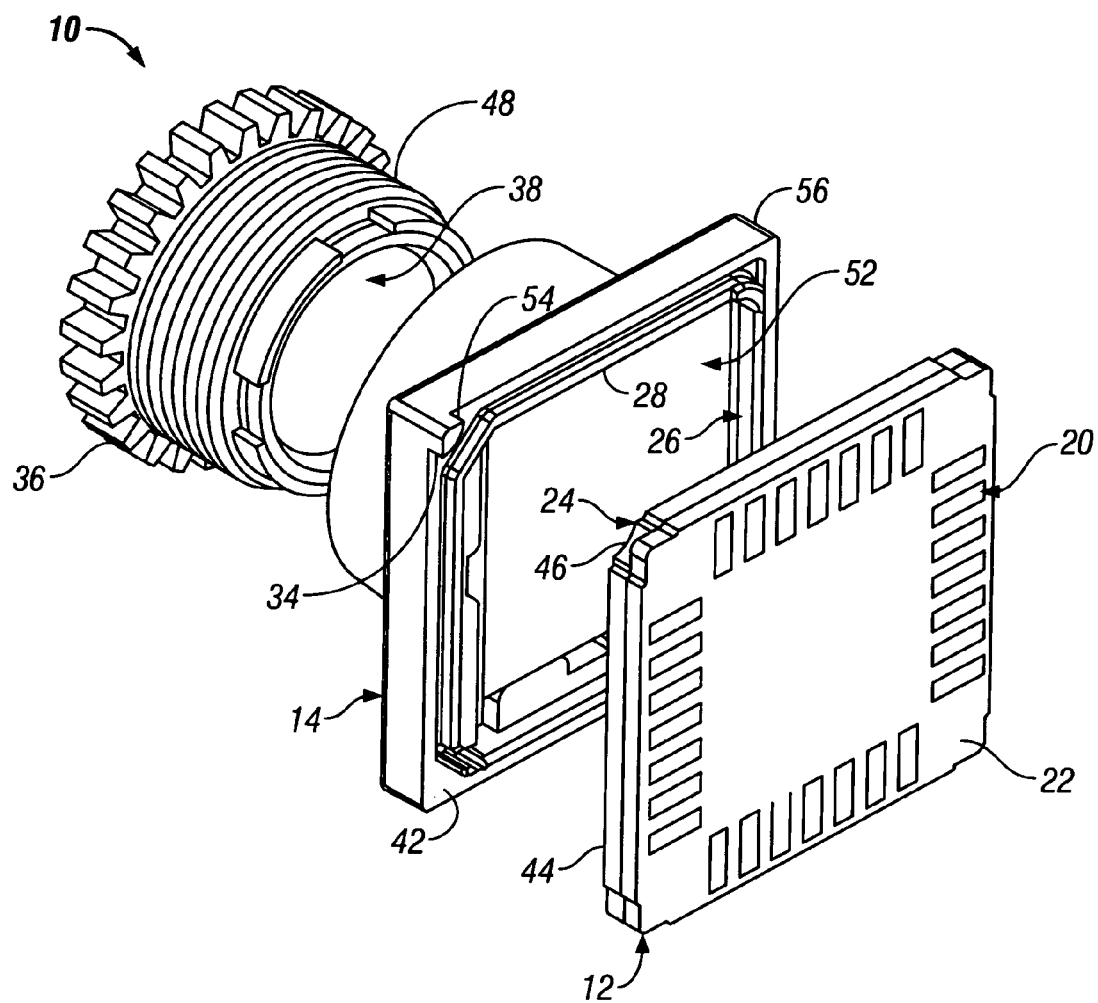
FIG. 2 is an exploded perspective view showing the back portion of the image capture device illustrated in FIG. 1.

The lens module 14 is adapted or configured to be mounted to the substrate 12. A light blocking member 26, such as a shoulder 28, is provided on the lens module 14, as best seen in FIG. 2. As will be described in greater detail below, the light blocking member 26 cooperates with the substrate 12 to substantially prevent light from entering an interior region 30 defined by the substrate 12 and lens module 14 through a joint 32 defined therebetween. See FIGS. 3 and 4. One or more lens indexing members 34 are also provided on the lens module 14. The lens indexing members 34 cooperate with the corresponding substrate indexing members 24 to align the lens module 14 with respect to the substrate 12. In the embodiment shown and described herein, the lens module 14 may also comprise a lens barrel assembly 36 that contains one or more lenses 38 suitable for focusing light onto the image sensor 16. The lens module 14 may be fabricated from any of a wide range of materials, such as polymer plastics, suitable for the intended application.

The lens module 14 may be secured to the substrate 12 by any of a wide variety of adhesives. By way of example, in one embodiment, adhesive used to mount the lens module 14 to the substrate 12 comprises an epoxy resin. The adhesive may be provided to either or both of the mating surfaces 40 and 42 that define the joint 30 when the lens module 14 is mounted to the substrate 12. Once the adhesive has been applied, the lens module 14 may be positioned in contact with the substrate 12 so that the adhesive on the mating surfaces 40 and 42 can bond the two together. As the substrate 12 and lens module 14 are brought together, the lens indexing members 34 engage the substrate indexing members 24 to align the substrate 12 and lens module 14. As mentioned above, the light blocking member 26 cooperates with the substrate 12 to substantially prevent light from entering the interior region 30 of the image capture device 10 through the joint 32. See FIGS. 3 and 4.

A significant advantage of the present invention is that the light blocking member 26 substantially prevents light leakage through the joint 32 defined between the substrate 12 and lens module 14. Light leakage through various joints in prior art image capture devices had posed a problem. In addition, the structural configuration of the image capture device allows the substrate 12 and lens module 14 to be secured together without the danger that the adhesive will inadvertently contaminate either the image sensor 16 or the solder pads 20, which had also been a problem in prior art devices. The substrate and lens indexing members 24 and 34 provide for positive indexing (i.e., alignment) between the substrate 12 and lens module 14. The positive indexing ensures good optical alignment, but without the need to provide through-holes in the substrate 12 holding the image sensor 16. In prior art devices, such through-holes provided another avenue by which the adhesive used to secure the components could contaminate solder pads or conductive traces provided on the substrate.

Still other advantages can be realized if the substrate 12 is fabricated from a ceramic material. For example, in the embodiment shown and described herein wherein the front side 18 of the substrate 12 receives the image sensor 16 and wherein the back side 22 contains one or more solder pads 20 that are electrically connected to the image sensor 16, the solder pads 20 can be readily soldered to another substrate, such as a flexible printed wiring board (not shown), without danger of warping the substrate 12. Warping of the substrate during the soldering process had been a problem in prior art devices.

Having briefly described one embodiment of an image capture device, as well as some of its more significant features and advantages, various exemplary embodiments of the present invention will now be described in detail. However, before proceeding with the description, it should be noted that the various exemplary embodiments of the invention are shown and described as they could be used in an image sensing system suitable for producing mono-chromatic electronic signals (i.e., data) representative of a two-dimensional image focused on the image sensor 16. However, other embodiments and variations of imaging systems are possible (e.g., one-dimensional or line imaging systems, or color imaging systems for either one-dimensional or two-dimensional image data), as would become apparent to persons having ordinary skill in the art after having become familiar with the teachings provided herein. Consequently, the present invention should not be regarded as limited to the particular embodiments and applications shown and described herein.

Referring back now to FIGS. 1 and 2, one embodiment of an image capture device 10 may comprise a substrate 12 and a lens module 14 configured to be mounted to the substrate 12. The substrate 12 may comprise any of a wide variety of shapes or configurations suitable for the particular application. By way of example, in one embodiment the substrate 12 comprises a generally rectangularly shaped (e.g., square), plate-like member having a front side 18 and a back side 22. The front side 18 is configured to receive the image sensor 16, whereas the back side 22 is provided with one or more solder pads 20. A plurality of circuit traces or conductive paths (not shown) provided within the substrate 12 allow the image sensor 16 to be electrically connected to one or more solder pads 20 provided on the back side 22 of substrate 12.

The substrate 12 may be fabricated from any of a wide range of materials and in accordance with any of a wide range of processes now known in the art or that may be developed in the future that are or would be suitable for the intended application. Consequently, the present invention should not be regarded as limited to substrates 12 being fabricated from any particular material. However, and as was briefly mentioned above, it may be advantageous to fabricate the substrate 12 from a ceramic material (e.g., alumina) or combination of ceramic materials and produced according to any of a number of conventional processes, such as a high-temperature co-fired ceramic (HTCC) process. Alternatively, the substrate 12 could be fabricated from other ceramic materials by other processes, such as low-temperature co-fired ceramic processes (LTCC). Fabricating the substrate 12 from a ceramic material provides a highly stable base for the image capture device 10 and also significantly reduces the likelihood that the substrate 12 will become warped during subsequent soldering processes.

For example, in one embodiment, the solder pads 20 provided on the back side 22 of substrate 12 are soldered to a flexible printed circuit (not shown) which electrically connects the image sensor 16 to an external electronic system (also not shown). The flexible printed circuit is attached to the pads 20 by means of a hot bar soldering process. The heat applied to the solder pads 20 and substrate 12 during the hot bar soldering process may be sufficient to warp substrates made from non-ceramic materials, such as, for example, substrates made from epoxy-glass materials. Therefore, if warping of the substrate 12 is to be avoided, it will be generally preferable to fabricate the substrate 12 from a ceramic material.

In the embodiment shown and described herein wherein the substrate 12 comprises alumina, the circuit traces (not shown) provided therein comprise tungsten. Alternatively, other metals or metal alloys that are compatible with the particular substrate material may also be used, as would become apparent to persons having ordinary skill in the art after having become familiar with the teachings provided herein. Accordingly, the present invention should not be regarded as limited to metal traces having any particular composition.

The substrate 12 may also be provided with a perimeter ring 44. The perimeter ring 44 defines the mounting surface 40 for the lens module 14 and also cooperates with the light blocking member 26 provided on the lens module 14 in the manner that will be described in greater detail below. In the embodiment shown and described herein, the perimeter ring 44 is also provided with one or more notches 46 therein which form the respective substrate indexing members 24.

The perimeter ring 44 may comprise a separate member that is then attached to the substrate 12, such as, for example, by a suitable adhesive. Alternatively, the perimeter ring 44 may be defined as an integral portion (e.g., a raised perimeter) of the substrate 12 during the formation thereof. Consequently, the present invention should not be regarded as limited to a perimeter ring 44 comprising a separate element or as being defined during the formation of the substrate 12. However, by way of example, in one embodiment, the perimeter ring 44 comprises a ceramic material (e.g., alumina) that is attached or secured to the substrate 12 before the ceramic material is fired. After the firing process, the perimeter ring 44 becomes an integral part of the substrate 12.

The image sensor 16 may comprise any of a wide range of image sensing devices now known in the art or that may be developed in the future that are or would be suitable for the intended application. Consequently, the present invention should not be regarded as limited to use with any particular type of image sensor 16. However, by way of example, in one embodiment, the image sensor 16 comprises a two-dimensional CMOS array.

The image sensor 16 may be secured to the front side 18 of substrate 12 and may be electrically connected to the pads (not shown) provided on the front side 18 of substrate 12 by any of a wide variety of techniques known in the art or that may be developed in the future. By way of example, in one embodiment, the image sensor 16 is secured to the front side 18 of the substrate 12 by a suitable adhesive (e.g., "LE" tape). The image sensor 16 is electrically connected to the pads (not shown) provided on the front side 18 by a wire bonding process. However, because techniques for securing image sensors, such as image sensor 16, to substrates are well-known in the art and are not necessary to understand or practice the present invention, the particular techniques that may be utilized to operatively attach the image sensor 16 to the substrate 12 will not be described in further detail herein.

The lens module 14 is adapted to be mounted to the substrate 12 and may comprise a generally rectangularly shaped housing 56 sized to be received by the substrate 12. Alternatively, other configurations are possible. The housing 56 of lens module 14 may be provided with one or more lenses 38 suitable for focusing light onto the image sensor 16. In the embodiment shown and described herein, the lenses 38 are provided in a lens barrel assembly 36. The lens barrel assembly 36 may be provided with threads 48 sized to engage mating threads 50 provided in the housing 56 of lens module 14. Alternatively, other arrangements for providing one or more lenses 38 to the lens module 14 are possible. In the embodiment shown and described herein, the lens module 14 is also provided with an infra-red filter 52, as best seen in FIG. 2. As its name implies, the infra-red filter removes or filters infra-red light before it is allowed to reach the image sensor 16.

However, because the various optical components (e.g., lenses 38 and filter 52), and how they may be provided in the lens module 14 (e.g., via a separate lens barrel assembly 36), may vary depending on the particular application, and because the details of the types of components and their arrangements are not necessary to understand or practice the present invention, the particular arrangements of the lenses 38, filter 52, and how they may be mounted to the lens module 14 will not be described in further detail herein.

The housing 56 of lens module 14 may be fabricated from any of a wide range of materials and accordance with any of a wide range of processes now known in the art or that may be developed in the future that are or would be suitable for the intended application. Consequently, the present invention should not be regarded as limited to a lens module 14 fabricated from any particular material or formed by any particular process. However, by way of example, in one embodiment, the housing 56 of lens module 14 as well as lens barrel assembly 36 are both molded from a liquid crystal polymer, such as Solvay-Xydar G-930.

Referring now primarily to FIGS. 2–4, the lens module 14 is also provided with a light blocking member 26 that cooperates with the substrate 12 to substantially prevent light from entering the interior region 30 (FIGS. 3 and 4) of the image capture device 10. In the embodiment shown and described herein, the light blocking member 26 comprises a shoulder 28. The shoulder 28 is sized to fit adjacent the perimeter ring 44 provided on the substrate 12, as best seen in FIGS. 3 and 4. The shoulder 28 comprising the light blocking member 26 may comprise a separate element that is mounted to the housing 56 of lens module 14. Alternatively, the light blocking ember 26 may be defined during the formation of the housing 56 of lens module 14. In the embodiment shown and described herein, the shoulder 28 is defined during the molding of the housing 56 of lens module 14, i.e., the shoulder 28 is molded as an integral element of the housing 56 of lens module 14.

Before proceeding with the description, it should be noted that because the light blocking member 26 on the lens module 14 cooperates with substrate 12 to substantially prevent light from entering the interior region 30 through the joint 32, the identification of the light blocking member 26, as well as its location, may be subject to variable interpretation. For example, the perimeter ring 44 could be regarded as providing a light blocking function as well, or providing at least a portion of the light blocking function, because its position serves to block light from the tip or outer extent of the shoulder 28. That is, in an such an alternate definition, the perimeter ring 44 could be regarded as the light blocking member 26, whereas the shoulder 28 could be regarded as a supplemental light blocking member 26. The definition provided herein is based on the primary function of the respective elements, with the primary function of the perimeter ring 44 being that of defining the mounting surface 40, and the primary function of the shoulder 28 as being that of substantially blocking light that may enter through the joint 32 defined by the two mounting surfaces 40 and 42. In summation then, such other definitions that may regard the light blocking member 26 as being provided to, or defined by, the substrate 12 should also be regarded as within the scope of the present invention.

The lens module 14 is also provided with one or more lens indexing members 34 sized to cooperate with the corresponding substrate indexing members 24 provided on the substrate. The cooperation of the lens indexing members 34 with the substrate indexing members 24 serves to positively locate or align the substrate 12 and lens module 14, therefor ensuring accurate optical alignment. In the embodiment shown and described herein, the lens indexing members 34 comprise pins 54 that are sized to engage the notches 46 defined by the perimeter ring 44 of the substrate 12.

The lens module 14 may be secured to the substrate 12 by any of a wide variety of adhesives now known in the art or that may be developed in the future that are or would be suitable for the particular materials comprising the substrate 12 and lens assembly 14, as well as for the particular application. Consequently, the present invention should not be regarded as limited to any particular adhesives. However, by way of example, in one embodiment, the adhesive comprises an epoxy resin of the type well-known in the art and that is readily commercially available. The adhesive may be provided to either or both of the mating surfaces 40 and 42 that define the joint 30 when the lens module 14 is mounted to the substrate 12. Alternatively, depending on the type of adhesive that is used, the adhesive may be applied externally to the joint 30 after the substrate 12 and lens assembly 14 have been positioned together. In any event, as the substrate 12 and lens module 14 are brought together, the lens indexing members 34 engage the substrate indexing members 24 to accurately locate or align the substrate 12 and the lens module 14. When brought fully together, the shoulder 28 comprising the light blocking member 26 cooperates with the perimeter ring 44 provided on the substrate 12 to substantially prevent light from entering the interior region 30 of the image capture device 10.

Having herein set forth preferred embodiments of the present invention, it is anticipated that suitable modifications can be made thereto which will nonetheless remain within the scope of the invention. The invention shall therefore only be construed in accordance with the following claims.

What is claimed is:

1. An image capture device, comprising:
   a substrate having a front side and a back side;
   a substrate indexing member provided on said substrate;
   an image sensor mounted to the front side of said substrate;
   a lens module mounted to the front side of said substrate;
   a light blocking member provided on said lens module, said light blocking member cooperating with said substrate to substantially prevent light from entering an interior region defined by said lens module and said substrate through a joint defined between said lens module and said substrate; and
   a lens indexing member provided on said lens module, said lens indexing member cooperating with said substrate indexing member to align said lens module with respect to said substrate.

2. The image capture device of claim 1, further comprising a perimeter ring mounted to the front side of said substrate.

3. The image capture device of claim 2, wherein said substrate indexing member comprises a notch defined by said perimeter ring.

4. The image capture device of claim 3, wherein said lens indexing member comprises a pin, said pin being sized to be received by the notch defined by said perimeter ring.

5. The image capture device of claim 4, wherein said pin is defined by said lens module.

6. The image capture device of claim 2, wherein said light blocking member comprises a shoulder, said shoulder fitting in adjacent relationship to said perimeter ring, the adjacent relationship of the shoulder defined by said lens module and the perimeter ring mounted to the front side of said substrate blocking light from entering the interior region through the joint defined between said lens module and said substrate.

7. The image capture device of claim 6, wherein said shoulder is defined by said lens module.

8. The image capture device of claim 1, wherein said substrate comprises a ceramic material.

9. The image capture device of claim 1, wherein said lens module comprises a polymer material.

10. The image capture device of claim 1, wherein the back side of said substrate includes a plurality of solder pads therein and wherein said image sensor is electrically connected to the plurality of solder pads provided on the back side of said substrate.

11. An image capture device, comprising:
a substrate having a front side, a back side, and a substrate indexing member;
an image sensor mounted to the front side of said substrate; and
a lens module mounted to the front side of said substrate, said lens module including a light blocking member, the light blocking member substantially preventing light from entering an interior region defined by said lens module and said substrate through a joint defined between said lens module and said substrate, said lens module also including a lens indexing member, said lens indexing member cooperating with the substrate indexing member to align said lens module and said substrate.

12. The image capture device of claim 11, wherein said substrate defines a raised perimeter on the front side of said substrate.

13. The image capture device of claim 12, wherein the light blocking member comprises a shoulder, said shoulder fitting in adjacent relationship to the raised perimeter on the front side of said substrate, the adjacent relationship of the shoulder and the raised perimeter substantially preventing light from entering the interior region through the joint defined between said lens module and said substrate.

14. The image capture device of claim 13, wherein said shoulder is defined by said lens module.

15. The image capture device of claim 12, wherein the substrate indexing member comprises a notch defined by the raised perimeter of said substrate.

16. The image capture device of claim 15, wherein the lens indexing member comprises a pin sized to be received by the notch defined by the raised perimeter of said substrate.

17. The image capture device of claim 16, wherein said pin is defined by said lens module.

18. The image capture device of claim 11, wherein said substrate comprises ceramic.

19. The image capture device of claim 11, further comprising a plurality of solder pads provided on the back side of said substrate and wherein said image sensor is electrically connected to the plurality of solder pads provided on the back side of said substrate.

20. An image capture device, comprising:
a substrate having a front side, and a raised perimeter, said raised perimeter defining a notch therein;
an image sensor mounted to the front side of said substrate;
a lens module mounted to the front side of said substrate, said lens module including a shoulder, said shoulder fitting in adjacent relationship to the raised perimeter on said substrate, the adjacent relationship of the shoulder and the raised perimeter substantially preventing light from entering an interior region defined by said lens module and said substrate through a joint defined between said lens module and said substrate, said lens module also including a pin, said pin engaging the notch defined by the raised perimeter of said substrate to align said lens module and said substrate.

* * * * *